(12) United States Patent
Sagara et al.

(10) Patent No.: US 8,247,936 B2
(45) Date of Patent: Aug. 21, 2012

(54) ELECTRIC MOTOR AND ELECTRIC MOTOR VEHICLE

(75) Inventors: Hiroaki Sagara, Kasai (JP); Kenji Taguchi, Hirakata (JP); Tetsuji Ueta, Hirakata (JP); Takeshi Nagao, Hirakata (JP); Takashi Uchino, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 168 days.

(21) Appl. No.: 12/748,627

(22) Filed: Mar. 29, 2010

(65) Prior Publication Data
US 2010/0270873 A1 Oct. 28, 2010

(30) Foreign Application Priority Data
Apr. 27, 2009 (JP) .................................. 2009-108372

(51) Int. Cl.
*H02K 11/00* (2006.01)
(52) U.S. Cl. ........................ 310/68 C; 310/68 B; 310/43
(58) Field of Classification Search .................. 310/43, 310/68 B, 68 C; 29/596–598
See application file for complete search history.

(56) References Cited

U.S. PATENT DOCUMENTS

| 6,081,056 A * | 6/2000 | Takagi et al. ................... 310/89 |
| 6,153,954 A * | 11/2000 | Uchida et al. ............... 310/68 C |
| 8,022,584 B2 * | 9/2011 | Heim .......................... 310/68 C |

FOREIGN PATENT DOCUMENTS

| JP | 05336708 A | * 12/1993 |
| JP | 2008-136324 A | 6/2008 |
| JP | 2008136324 | * 6/2008 |

* cited by examiner

*Primary Examiner* — Quyen Leung
*Assistant Examiner* — Leda Pham
(74) *Attorney, Agent, or Firm* — Marvin A. Motsenbocker; MOTS LAW, PLLC

(57) ABSTRACT

An electric motor includes: a stator of columnar shape including a stator core of annular shape and mold resin molding the stator core, the stator core accommodating a rotor configured to rotate about a rotary shaft; and a temperature detecting element buried in the mold resin. The stator core includes a plurality of stator teeth around which a coil wounded around respectively. The temperature detecting element is buried in the mold resin from any one of the pair of end surfaces at a position between two adjacent stator teeth.

10 Claims, 12 Drawing Sheets

CIRCUMFERENTIAL
DIRECTION

ELECTRIC MOTOR AND ELECTRIC MOTOR VEHICLE

CROSS REFERENCE TO RELATED APPLICATIONS

This application is based upon and claims the benefit of priority from prior Japanese Patent Application No. 2009-108372, filed on Apr. 27, 2009; the entire contents of which are incorporated herein by reference.

BACKGROUND OF THE INVENTION

1. Field of the Invention

The present invention relates to an electric motor including mold resin molded on a stator core and to an electric motor vehicle.

2. Description of the Related Art

There has been known an electric motor including a case which accommodates a stator core, coils and a rotor. In the electric motor, the polarity of the coil is repeatedly reversed to cause the rotor, which is provided inward of the stator core in a radial direction thereof, to rotate about a rotary shaft of the rotor. Meanwhile, such electric motor is used as a power source for an electric motor vehicle, for example.

There has been proposed a technique to improve radiation of heat transmitted from the coils provided to the stator core. In the technique, mold resin is filled into a case with the stator core mounted therein.

In addition, there has been proposed an electric motor including a temperature detecting element configured to detect the temperature of each coil. To be more specific, a hole is formed in the mold resin extending from an outer side to an inner side of the stator core in a radial direction thereof, and the temperature detecting element is inserted into the hole formed in the mold resin (e.g., Japanese Patent Application Publication No. 2008-136324).

As described above, the hole formed in the mold resin has a shape extending inwardly from the outside of the stator core in the radial direction thereof. Since coils are provided inward of the stator core in the radial direction, the hole to receive the temperature detecting element is provided outward of the coil in the axial direction of the rotary shaft of the rotor. In other words, the temperature detecting element is placed at a position near the surface of the electric motor in the axial direction of the rotary shaft of the rotor. At such position near the surface of the electric motor, the temperature detecting element is likely to be affected by ambient conditions of the electric motor (such as an outside temperature and wind).

As described above, the temperature detecting element is placed at a position where the temperature detecting element is likely to be affected by the ambient conditions of the electric motor, and thus the detection accuracy thereof would be insufficient.

SUMMARY OF THE INVENTION

An electric motor of a first aspect includes: a stator of columnar shape (stator 20) including a stator core of annular shape (stator core 70) and mold resin (mold resin 20A) molding the stator core, and a temperature detecting element buried in the mold resin. The stator core accommodates a rotor (rotor 80) configured to rotate about a rotary shaft. The stator has an outer circumferential side surface extending continuously in a circumferential direction of the stator, and a pair of end surfaces forming a top and a bottom of the stator. The stator core includes a plurality of stator teeth around which a coil wounded respectively. The temperature detecting element is buried in the mold resin from any one of the pair of end surfaces at a position between two adjacent stator teeth of the plurality of stator teeth.

In the first aspect, the electric motor further includes a case which accommodates the stator core. The case has a bottom surface portion which covers at least partially the bottom of the stator and the mold resin. The bottom surface portion has an insert hole to receive the temperature detecting element.

In the first aspect, the electric motor further includes a tubular attachment member which accommodates the temperature detecting element. The temperature detecting element is inserted in the insert hole together with the attachment member.

In the first aspect, the bottom surface portion is provided with a position detecting circuit board configured to detect a position of the rotor. The temperature detecting element is connected to the position detection circuit board by a signal line.

In the first aspect, the electric motor further includes a case which accommodates the stator core. The case includes a terminal for leading out a power line connected to the coil, to an outside of the electric motor. The temperature detecting element is connected to the terminal by a signal line.

An electric motor vehicle of second aspect includes the electric motor according to the first aspect.

BRIEF DESCRIPTION OF THE DRAWINGS

FIG. 16 is a view showing the assembly on which mold resin 20A is molded, according to Modification 2.

DETAILED DESCRIPTION OF THE EMBODIMENTS

An electric motor according to embodiments of the present invention will be described below with reference to the drawings. Note that, in the following description of the drawings, same or similar reference signs denote same or similar elements and portions.

It should be noted, however, that the drawings are schematic, and that the dimensional proportions and the like are different from the actual ones. Accordingly, specific dimensions and the like should be inferred based on the description given below. Moreover, the drawings also include portions having different dimensional relationships and ratios from each other.

[Summary of Embodiments]

An electric motor according to each embodiment includes: a stator of columnar-shape formed of an stator of annular shape core and mold resin; and a temperature detecting element buried in the mold resin. The stator core accommodates a rotor configured to rotate about a rotary shaft, and the mold resin molds the stator core. The stator has an outer circumferential side surface extending continuously in a circumferential direction of the stator, and a pair of end surfaces forming a top and a bottom of the stator. The stator core includes a plurality of stator teeth around which a coil is wounded respectively. The temperature detecting element is buried in the mold resin from any one of the pair of end surfaces at a position between two adjacent stator teeth of the multiple stator teeth.

In the embodiments, the temperature detecting element is buried in the mold resin from any one of the pair of end surfaces of the stator at the position between the two adjacent stator teeth. Accordingly, the temperature detecting element detects the temperature of each coil at a position where the detection is less likely to be affected by ambient conditions of the electric motor (such as an outside temperature and wind). In other words, the detection accuracy of the temperature detecting element is improved.

[Embodiment 1]

(Structure of Electric Motor)

Figure 1:
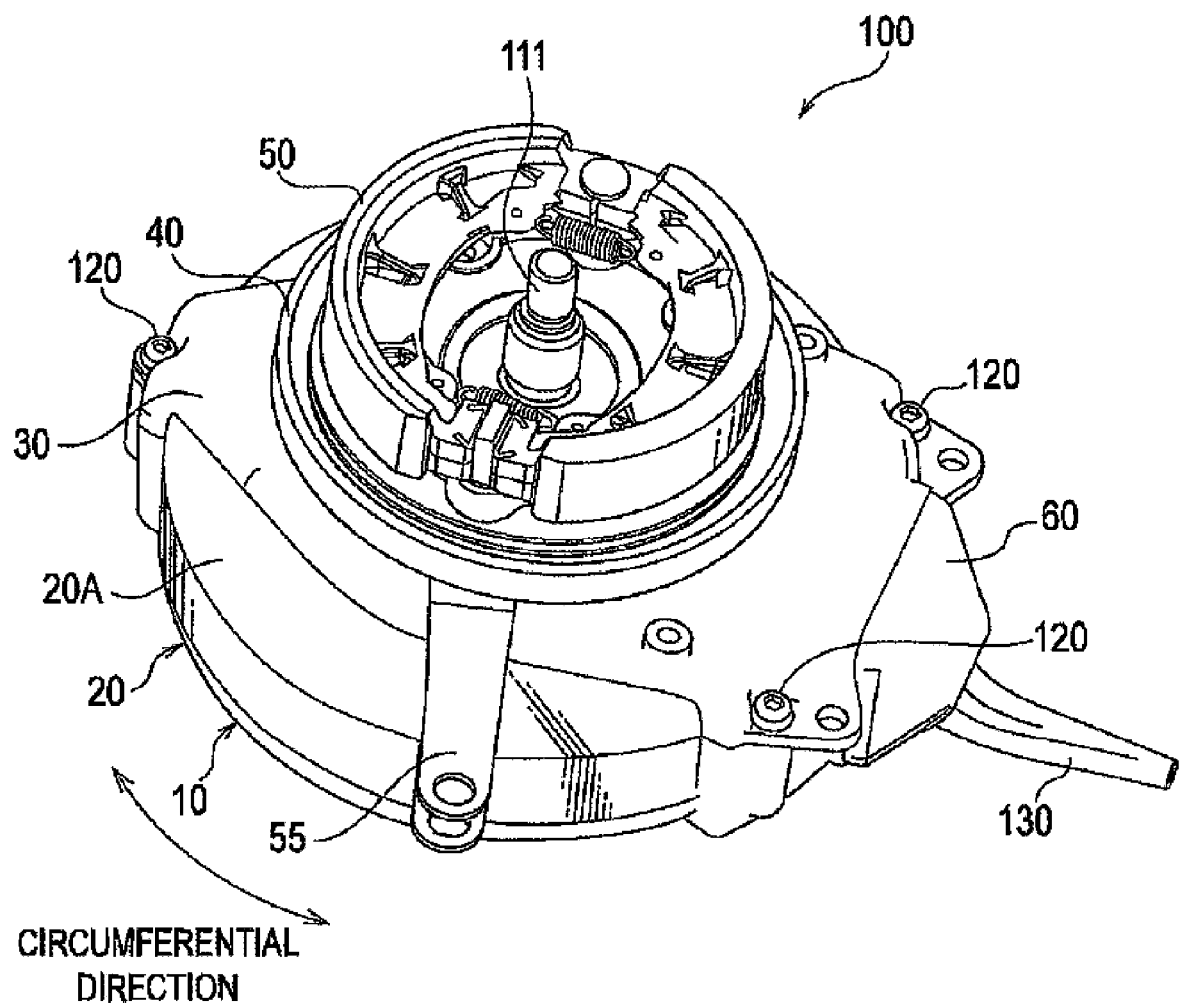
FIG. 1 is a perspective view showing an electric motor 100 according to Embodiment 1.
Figure 2:
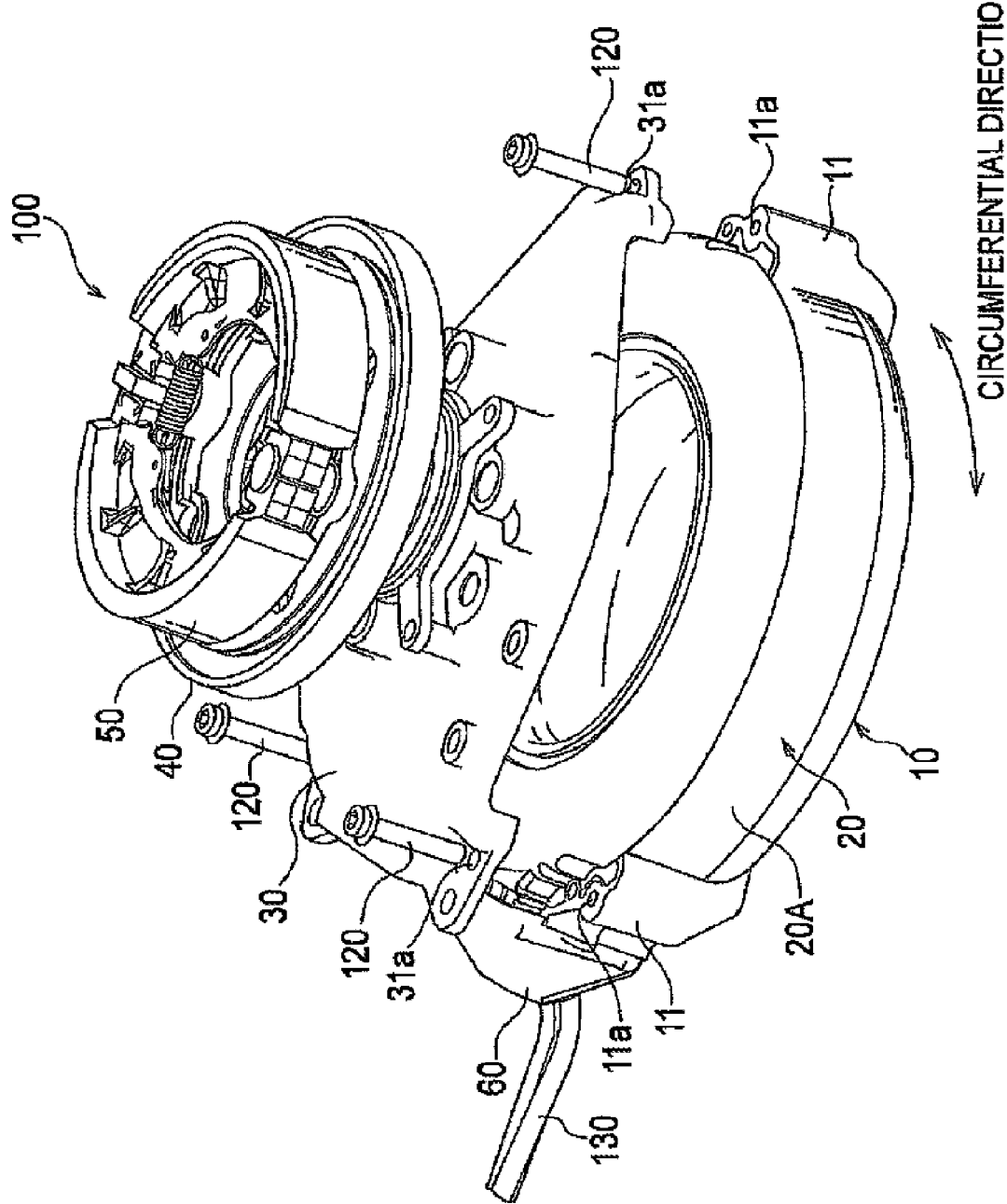
FIG. 2 is an exploded perspective view showing the electric motor 100 according to Embodiment 1.
Figure 3:
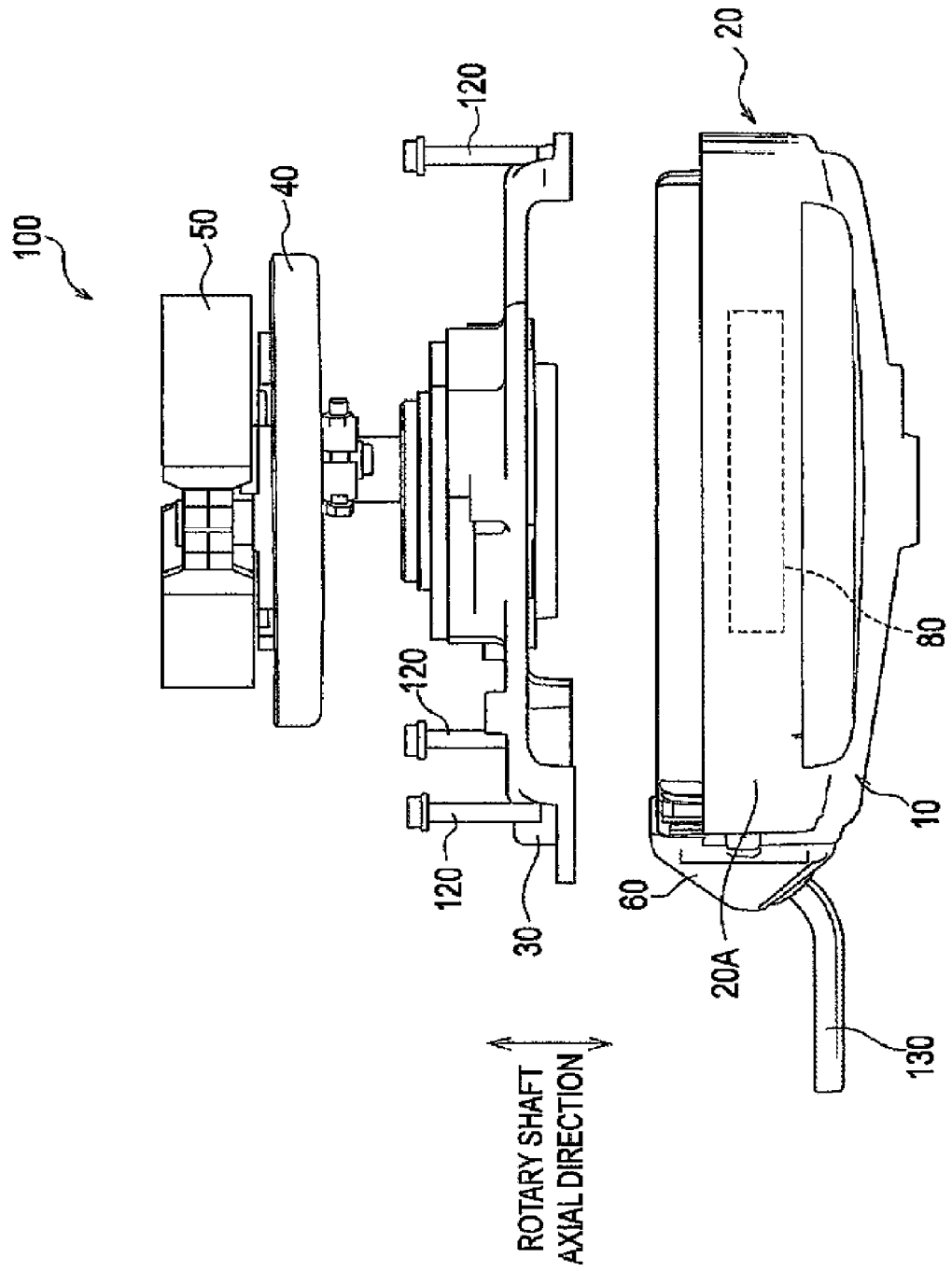
FIG. 3 is an exploded view showing the electric motor 100 according to Embodiment 1.

An electric motor according to Embodiment 1 will be described below with reference to the drawings. FIG. 1 is a perspective view showing an electric motor 100 according to Embodiment 1. FIG. 2 is an exploded perspective view showing the electric motor 100 according to Embodiment 1. FIG. 3 is an exploded view showing the electric motor 100 according to Embodiment 1.

As shown in FIGS. 1 to 3, the electric motor 100 includes a case 10, a stator 20, a cushioning member 30, a holding member 40, a braking mechanism 50, and a terminal cover 60.

The case 10 accommodates a stator core 70 to be described later (not shown in FIGS. 1 to 3; see FIG. 5). The case 10 is formed of a member having certain stiffness, such as a metal member. The case 10 includes guide ribs 11 each having a bolt hole 11a having a spiral groove. As will be described later, the case 10 has an opening 13 (not shown in FIGS. 1 to 3; see FIG. 4). The case 10 will be described later in detail (see FIG. 4).

The stator 20 is formed of mold resin 20A and the stator core 70. The mold resin 20A molds the stator core 70. The mold resin 20A is also filled into the opening 13 provided on the case 10. The mold resin 20A is made of a thermosetting material. The stator 20 will be described later in detail (see FIG. 6).

The cushioning member 30 is attached to the case 10. The cushioning member 30 has bolt holes 31a which receive bolts 120, respectively. The cushioning member 30 is attached to the case 10 by inserting the bolts 120 into the bolt holes 31a and then screwing the bolts 120 to the bolt holes 11a, respectively. The cushioning member 30 is formed of a member having certain stiffness, such a metal member.

In Embodiment 1, the case 10 forms a lower case which covers a bottom surface side of the stator core 70 whereas the cushioning member 30 forms an upper case which covers a top surface side of the stator core 70.

The holding member 40 holds the braking mechanism 50, and is attached to the cushioning member 30 by tightening bolts or doing the like.

The braking mechanism 50 is configured to control motion of a rotating rotor 80. The braking mechanism 50 includes a brake arm 55, and reduces the rotation of a rotary shaft 111 provided to the rotor 80 in accordance with how much the brake arm 55 pivots (moves). For example, in a case where the electric motor 100 is provided to an electric motor vehicle, the braking mechanism 50 is a drum brake configured to reduce the rotation force of a wheel provided to the electric motor vehicle.

Figure 9:
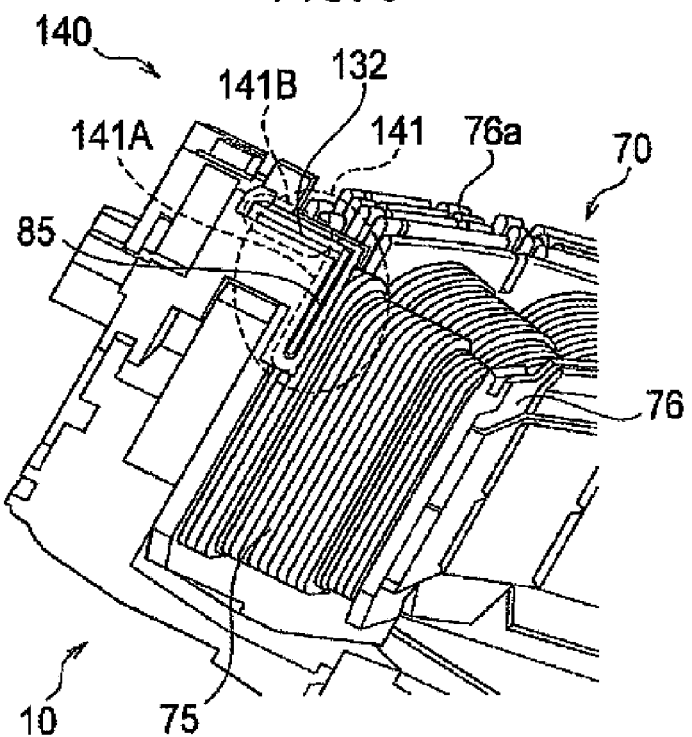
FIG. 9 is a view showing the assembly of the case 10, the stator core 70, and the leading out member 140 according to Embodiment 1.
Figure 10:
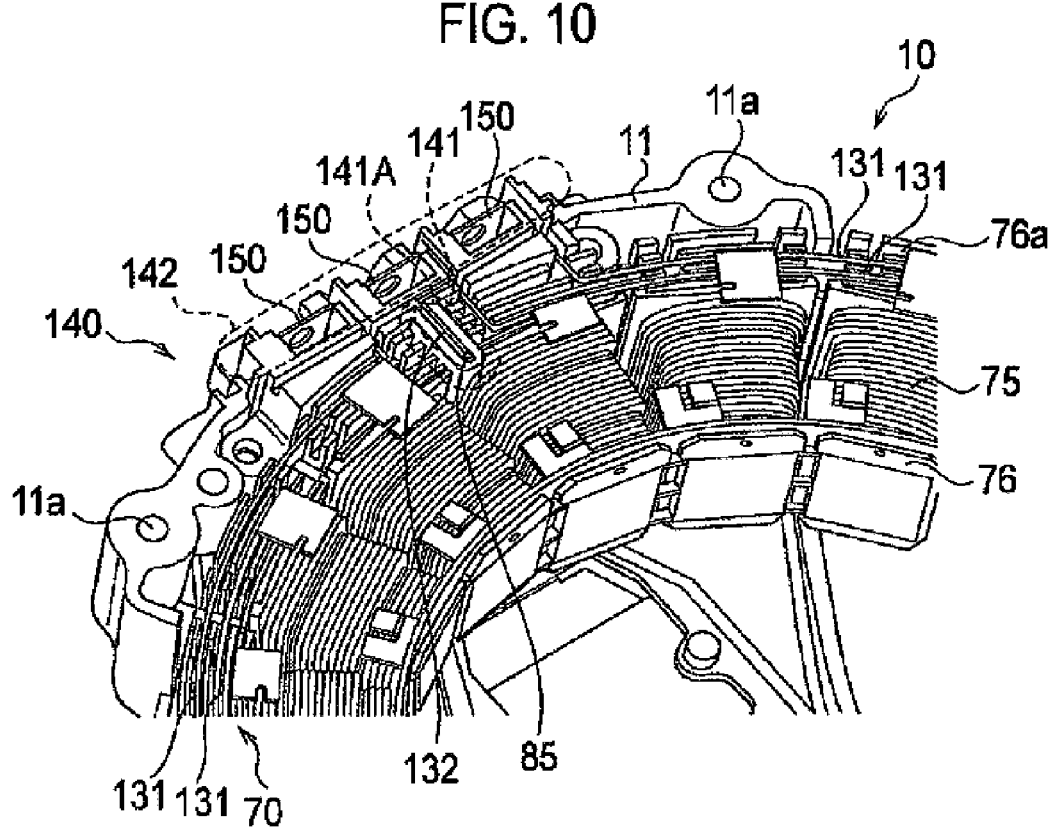
FIG. 10 is a view showing the assembly of the case 10, the stator core 70, and the leading out member 140 according to Embodiment 1.

The terminal cover 60 protects a connecter provided to one end of each of cables 130 and also terminals 150 to which the connecters are attached (not shown in FIGS. 1 to 3; see FIG. 10). The cables 130 are: a power line through which power is supplied to coils 75 to be described later (not shown in FIGS. 1 to 3; see FIGS. 8 to 10); a signal line through which a detection result from a temperature detecting element 85 to be described later (not shown in FIGS. 1 to 3; see FIGS. 9 and 10) is acquired; and the like. The temperature detecting element 85 has a columnar shape and is configured to detect the temperature of each coil 75.

(Structure of Case)

Figure 4:
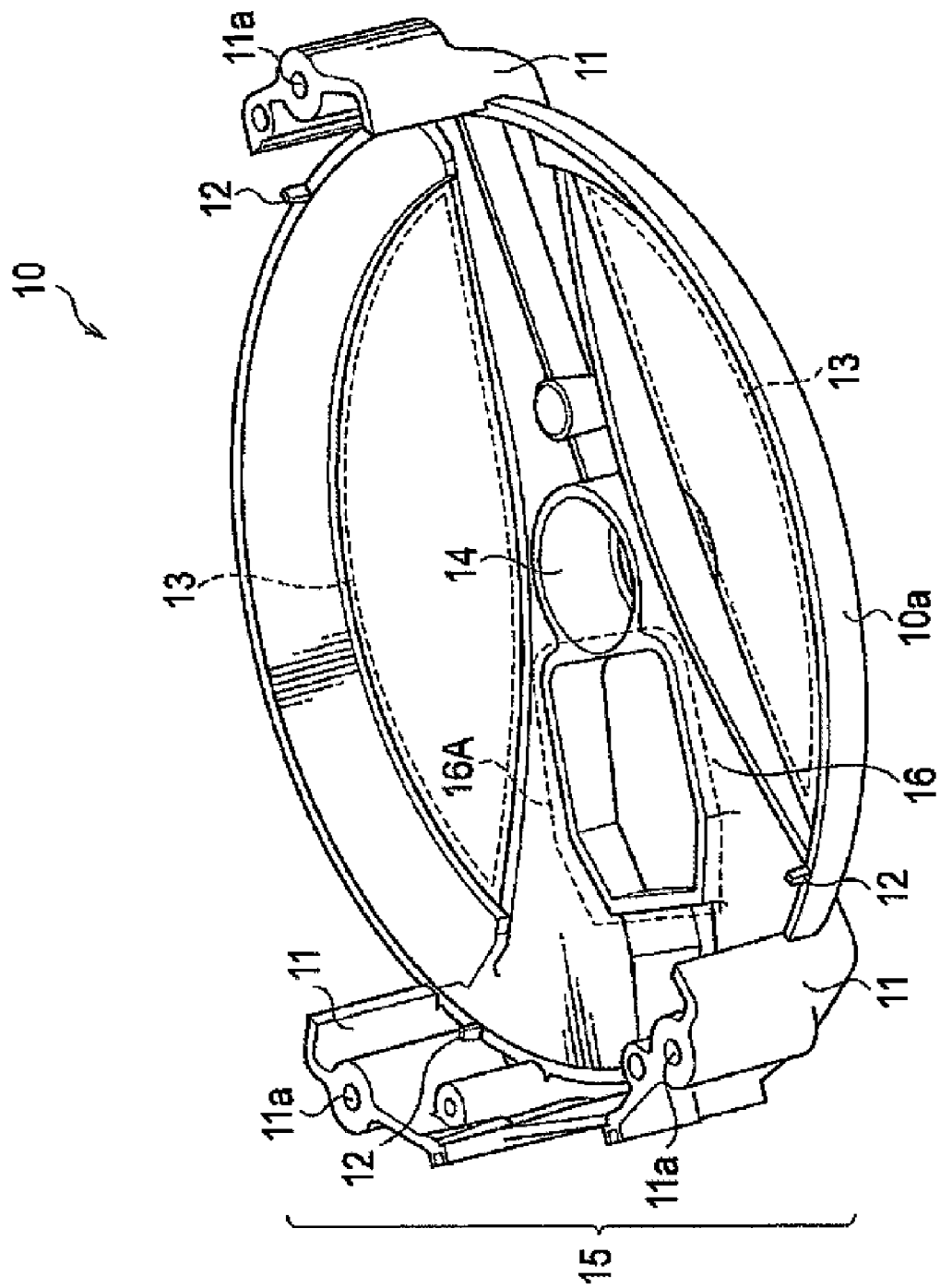
FIG. 4 is a perspective view showing a case 10 according to Embodiment 1.

The structure of the case according to Embodiment 1 will be described below with reference to the drawings. FIG. 4 is a perspective view showing the case 10 according to Embodiment 1.

As shown in FIG. 4, the case 10 includes the guide ribs 11, protrusions 12, the opening 13, a shaft hole 14, a cable leading out region 15, and a bottom surface portion 16.

The guide ribs 11 each have a protruded-shape in the axial direction, and are provided around an outer circumferential portion (an outer circumferential portion 73a to be described later) of the stator core 70 to be described later (not shown in FIG. 4; see FIG. 5). As described above, the guide ribs 11 have the bolt holes 11a in which the bolts 120 are screwed, respectively.

The protrusions 12 each have a shape protruded from a contact portion 10a which comes into contact with a portion on the bottom surface of the stator core 70.

As described above, the mold resin 20A (shown in FIG. 4; see FIGS. 1 to 3) is filled into the opening 13. In Embodiment 1, the mold resin 20A molded on the stator core 70 is exposed from the opening 13.

The shaft hole 14 receives the rotary shaft 111, which is provided to the rotor 80, together with a bearing mechanism such as a ball bearing (not shown).

The cable lead out region 15 includes the terminals 150 (not shown in FIG. 4; see FIG. 10) to terminate the cables 130 (not shown in FIG. 4; see FIGS. 1 to 3). As will be described later, the terminals 150 terminate bus rings 131 (not shown in FIG. 4; see FIG. 10) connected to the coils 75 (not shown in FIG. 4; see FIGS. 8 to 10). A signal line 132 connected to the temperature detecting element 85 is bundled together with the cables 130 and extended out to a controller (not shown).

The bottom surface portion 16 covers at least partially the bottom surface (a bottom surface 23 to be described later) of the stator 20 and the mold resin 20A. The bottom surface portion 16 has a circuit-board placement region 16A, which is a region to place a position detecting circuit board configured to detect the position of the rotor 80 (not shown in FIG. 4; see FIG. 3).

In Embodiment 1, the bottom surface portion 16 has a strip shape extending over the shaft hole 14. The shape of the bottom surface portion 16, however, is not limited to such shape. For example, the bottom surface portion 16 may have such a shape as to entirely cover the bottom surface (the bottom surface 23 to be described later) of the stator 20.

(Structure of Stator Core)

The structure of the stator core 70 according to Embodiment 1 will be described below with reference to the drawings. FIG. 5 is a plan view showing the stator core 70 according to Embodiment 1.

Figure 5:
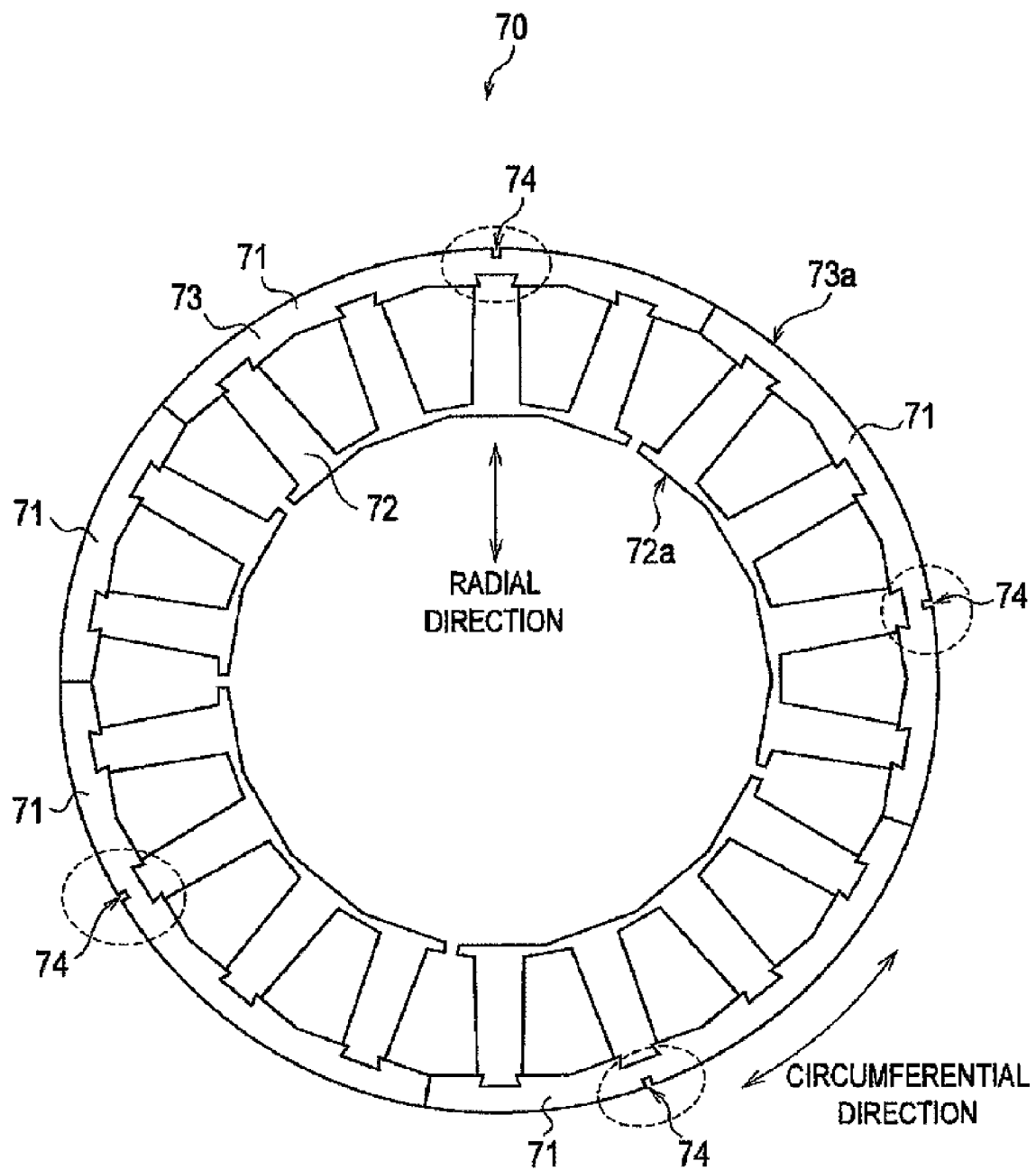
FIG. 5 is a plan view showing a stator core 70 according to Embodiment 1.

As shown in FIG. 5, the stator core 70 has an annular shape. The rotor 80 (not shown in FIG. 5; see FIG. 3) is placed inward of the stator core 70 in a radial direction thereof. To be more specific, the stator core 70 has stator yokes 73 which form an annular shape, and stator teeth 72 protruded inwardly in the radial direction from inner circumferential portions of the stator yokes 73. The stator core 70 is formed of multiple stator core segments 71.

Each of the stator teeth 72 has an insulator 76 (not shown in FIG. 5; see FIGS. 8 to 10) mounted thereon. The insulator 76 has the coil 75 to be described later (not shown in FIG. 5; see FIGS. 8 to 10) wounded around the insulator 76.

An end portion 72a of each stator tooth 72 has a hollow formed therein in a substantially columnar shape, for example. The outer circumferential portions 73a of some of the stator yokes 73 have grooves 74 which are to be engaged with the protrusions 12, respectively.

(Structure of Stator)

Figure 6A:
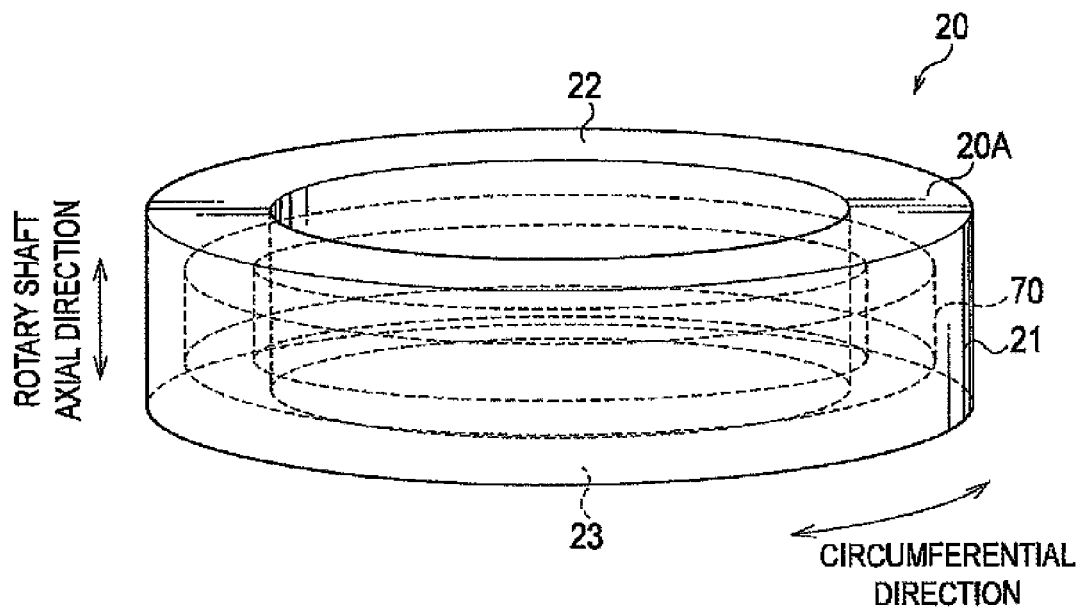
FIGS. 6A and 6B are views each showing a stator 20 according to Embodiment 1.
Figure 6B:
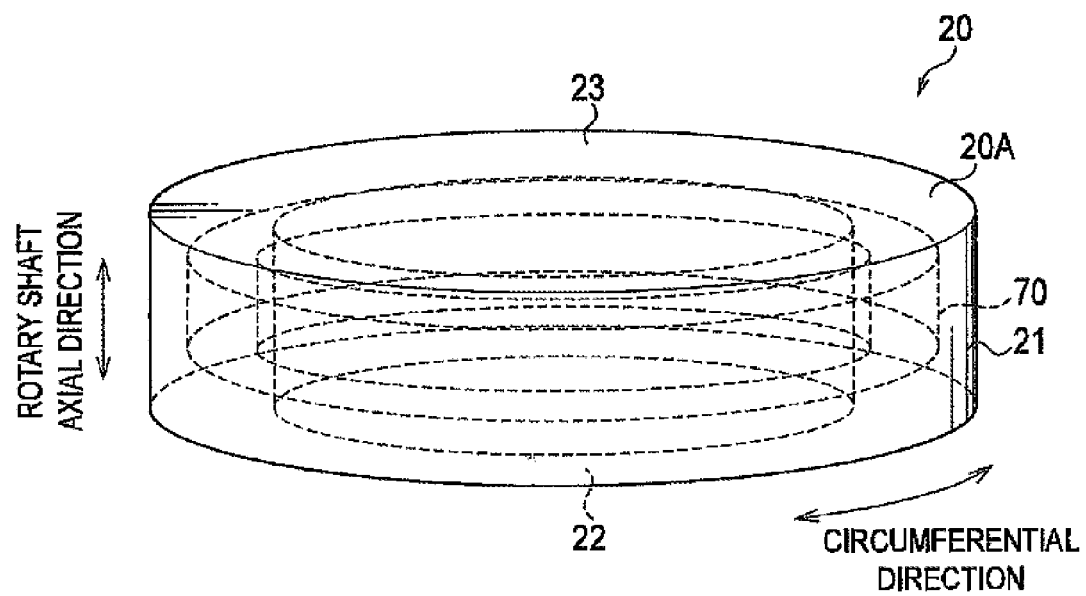

The structure of the stator according to Embodiment 1 will be described below with reference to the drawings. FIGS. 6A and 6B are diagrams each showing the stator 20 according to Embodiment 1. Specifically, FIG. 6A is a perspective diagram showing the top surface of the stator 20, and FIG. 6B is a perspective diagram showing the bottom surface of the stator 20.

As shown in FIGS. 6A and 6B, the stator 20 is formed of the mold resin 20A and the stator core 70. The stator 20 has a columnar shape. The stator 20 has an outer circumferential side surface 21 extending continuously in the circumferential direction of the stator 20, a top surface 22 provided on the side from which a rotating force of the rotor 80 is outputted, and the bottom surface 23 provided on the opposite side from the top surface 22. Note that the top surface 22 and the bottom surface 23 are a pair of end surfaces forming the top and bottom of the stator 20, respectively.

(Structure of Leading Out Member)

Figure 7:
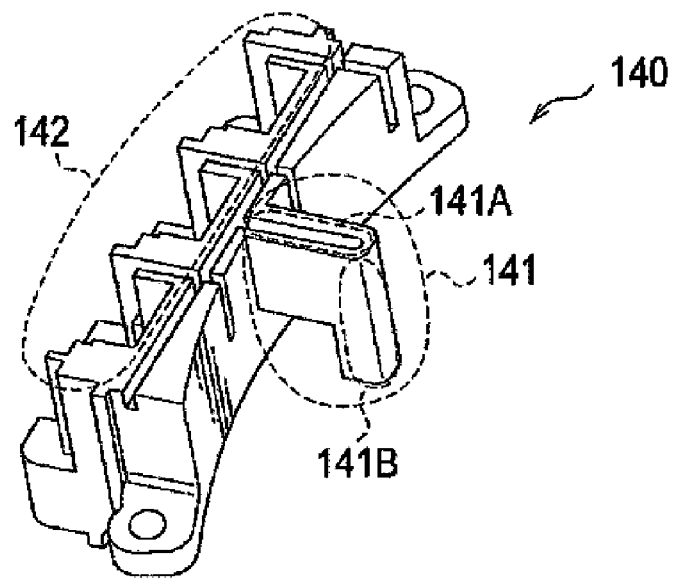
FIG. 7 is a view showing a leading out member 140 according to Embodiment 1.
Figure 8:
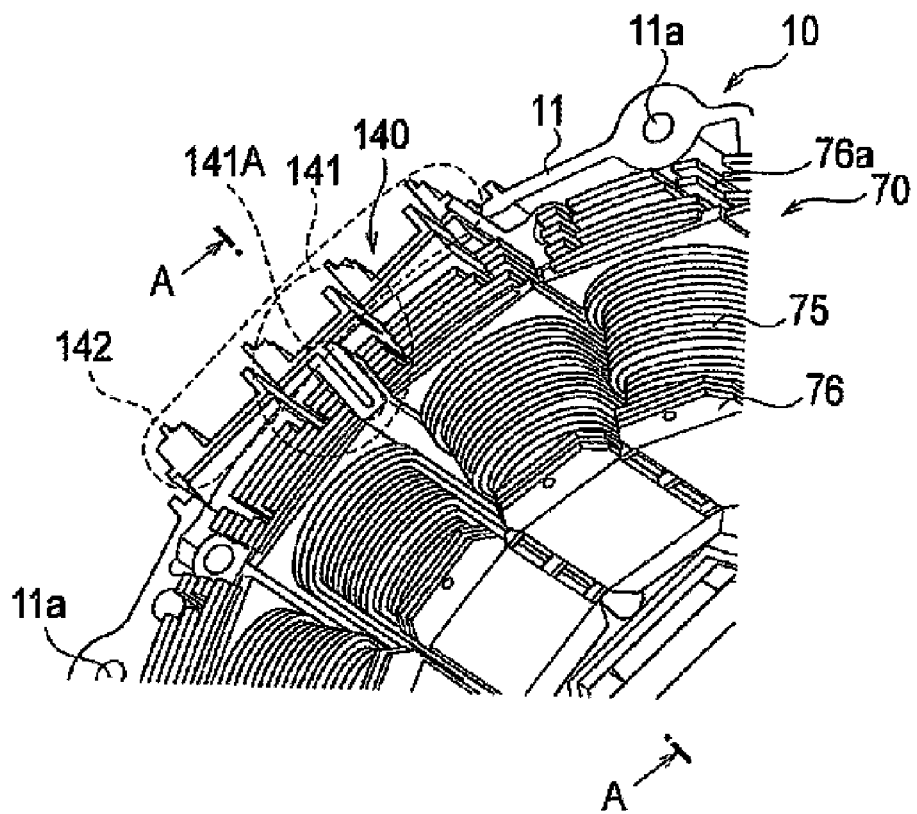
FIG. 8 is a view showing an assembly of the case 10, the stator core 70, and the leading out member 140 according to Embodiment 1.

The structure of the leading out member according to Embodiment 1 will be described below with reference to the drawings. FIG. 7 is a perspective view showing the leading out member 140 according to Embodiment 1. FIG. 8 is a perspective view showing an assembly of the case 10, the stator core 70, and the leading out member 140 according to Embodiment 1. FIG. 9 is a perspective view showing a cross section of the assembly of the case 10, the stator core 70, and the leading out member 140 according to Embodiment 1. Specifically, FIG. 9 is a view showing a cross section taken along the line A-A shown in FIG. 8. FIG. 10 is a cross-sectional view showing the assembly of the case 10, the stator core 70, and the leading out member 140 according to Embodiment 1. Specifically, in FIG. 10, the terminals 150 are attached to the leading out member 140 shown in FIG. 8.

As shown in FIGS. 7 to 10, the leading out member 140 has an element placement portion 141 and a terminal placement portion 142. The leading out member 140 is attached to the cable leading out region 15 in the case 10.

The element placement portion 141 has a groove 141A extending in the radial direction of the stator core 70, and a hole 141B extending in the axial direction of the rotary shaft of the rotor 80. The groove 141A guides the signal line 132, which is connected to the temperature detecting element 85, to the terminal placement portion 142. The hole 141B accommodates the temperature detecting element 85. The hole 141B is provided between two adjacent ones of the stator teeth 72.

Here, as described above, the mold resin 20A molds the stator core 70. Accordingly, the temperature detecting element 85 inserted in the hole 141B is buried in the mold resin 20A between the two adjacent stator teeth 72. Note that the temperature detecting element 20 is buried in the mold resin 20A from the top surface 22 of the stator 20.

The terminal placement portion 142 is provided with the terminals 150 used to terminate the cables 130. The terminals 150 include terminals provided to one ends of the bus rings 131 connected to the coils 75. In addition, the terminals 150 include a terminal provided to one end of the signal line 312 connected to the temperature detecting element 85 inserted into the hole 141B. Note that the hole 141B does not have to be formed in the axial direction of the rotary shaft of the rotor 80.

The insulator 76, around which the coil 75 is wounded, is mounted to each of the stator tooth 72 as described above. Moreover, the insulator 76 includes a bus ring holding portion 76A holds the bus ring 131 connected to the coil 75. The bus ring holding portion 76A is provided on an outer side of the stator 20 in the radial direction.

(Advantageous Effect)

In this embodiment, the temperature detecting element 85 is buried in the mold resin 20A from the top surface 22 of the stator 20 at a position between the two adjacent stator teeth 72. Accordingly, the temperature detecting element 86 detects the temperature of each coil 75 at a position where the detection is less likely to be affected by ambient conditions of the electric motor 100 (such as an outside temperature and wind). In other words, the detection accuracy of the temperature detecting element 85 is improved.

[Modification 1]

Modification 1 of Embodiment 1 will be described below with reference to the drawings. In the following, a difference from Embodiment 1 will be mainly described.

Specifically, the leading out member 140 has the element placement portion 141 and the temperature detecting element 85 is inserted into the hole 141B in the element placement portion 141 in Embodiment 1, whereas the temperature detecting element 85 is inserted into a hole provided in the case 10 in Modification 1.

(Placement of Temperature Detecting Element)

Figure 11:
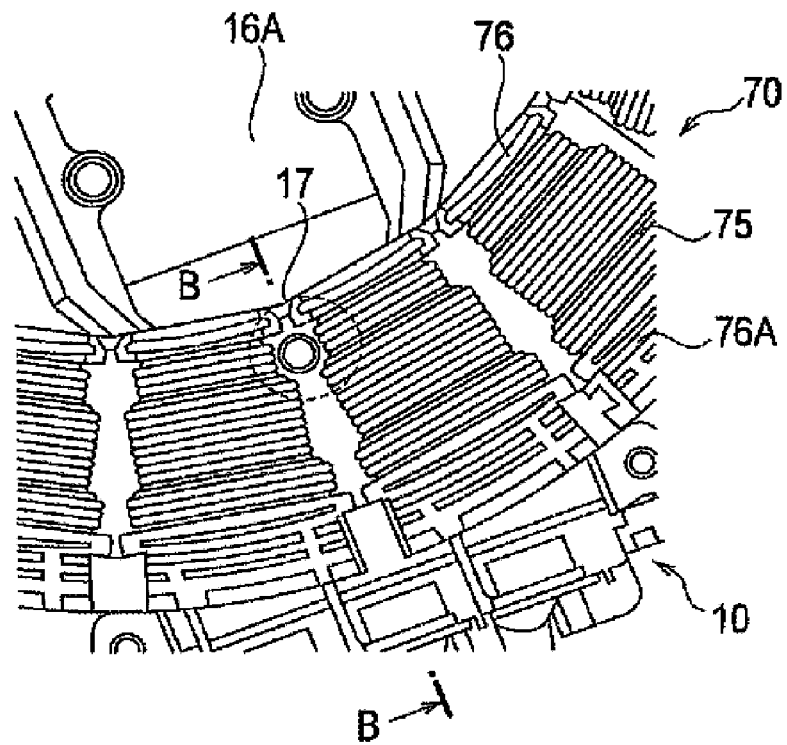
FIG. 11 is a view showing an assembly of the case 10, the stator core 70, and the leading out member 140 according to Modification 1.
Figure 12:
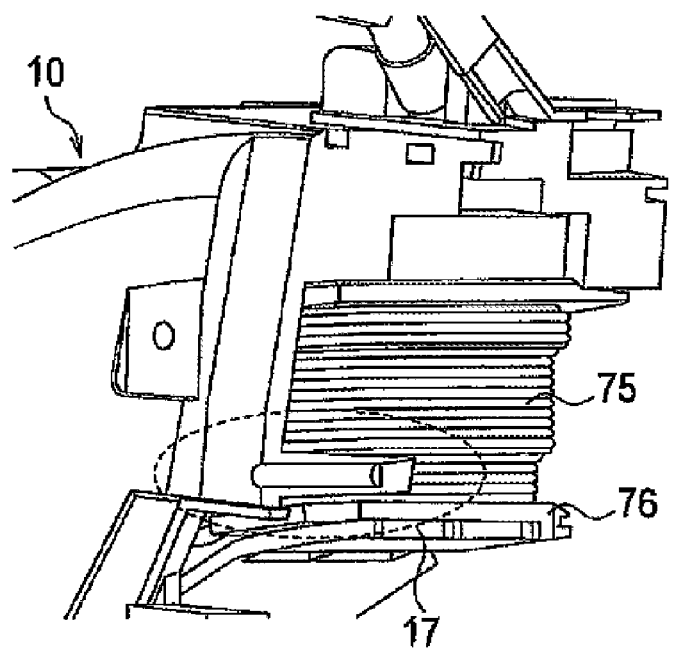
FIG. 12 is a view showing the assembly of the case 10, the stator core 70, and the leading out member 140 according to Modification 1.
Figure 13:
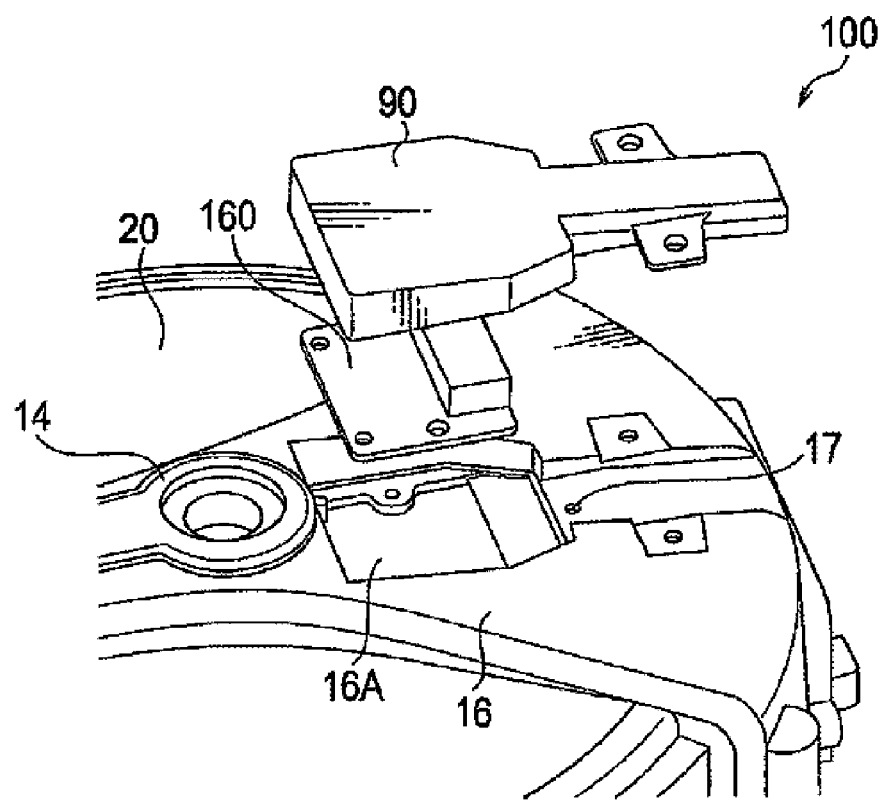
FIG. 13 is a view showing the assembly on which mold resin 20A is molded, according to Modification 1.

The placement of the temperature detecting element according to Modification 1 will be described below with reference to the drawings. FIG. 11 is a view showing an assembly of the case 10, the stator core 70, and the leading out member 140 according to Modification 1. FIG. 12 is a perspective view showing a cross section of the assembly of the case 10, the stator core 70, and the leading out member 140 according to Modification 1. Specifically, FIG. 12 is a view showing a cross section taken along the line B-B shown in FIG. 11. FIG. 13 is a view showing the assembly (the case 10, the stator core 70, and the leading out member 140) on which the mold resin 20A is molded, according to Modification 1.

As shown in FIGS. 11 to 13, the case 10 has a hole 17 extending in the axial direction of the rotary shaft of the rotor 80. The hole 17 is provided as a groove in the bottom surface portion 16 and accommodates the temperature detecting element 85 (not shown FIGS. 11 to 13; see FIGS. 9 and 10). The hole 17 is provided between two adjacent ones of the stator teeth 72.

Here, as described above, the mold resin 20A is molded on the stator core 70. Accordingly, the temperature detecting element 85 inserted into the hole 17 is buried in the mold resin 20A between the two adjacent stator teeth 72.

As described above, the bottom surface portion 16 of the case 10 has the circuit-board placement region 16A where a position detecting circuit board 160 configured to detect the position of the rotor 80 is placed. The position detecting circuit board 160 placed on the circuit-board placement region 16A is covered by a circuit-board cover 90. The circuit-board cover 90 covers the hole 17 in the bottom surface portion 16. Also, the position detecting circuit board 160 may be subjected to potting using urethane or the like, for example.

Note that the signal line 132 (not shown in FIGS. 11 to 13; see FIGS. 9 and 10), which is connected to the temperature detecting element 85 inserted into the hole 17, is connected to the position detecting circuit board 160. As described above, the signal line 132 is bundled together with the cables 130 and extended out to the controller (not shown).

[Modification 2]

Modification 2 of Embodiment 1 will be described below with reference to the drawings. In the following, a difference from Modification 1 will be mainly described.

The hole 17 into which the temperature detecting element 85 is inserted is provided in the case 10 in Modification 1, whereas a tubular attachment member to accommodate the temperature detecting element 85 is provided separately from the case 10.

(Placement of Temperature Detecting Element)

Figure 14:
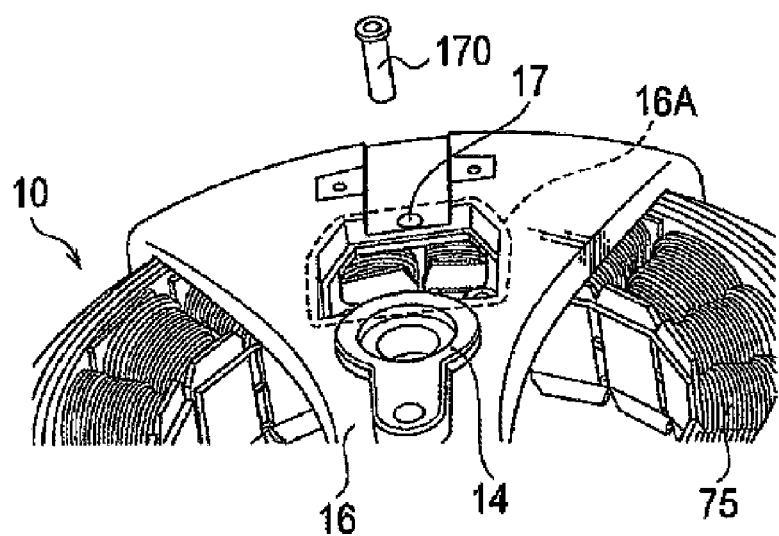
FIG. 14 is a view showing an assembly of the case 10, the stator core 70, and the leading out member 140 according to Modification 2.
Figure 15:
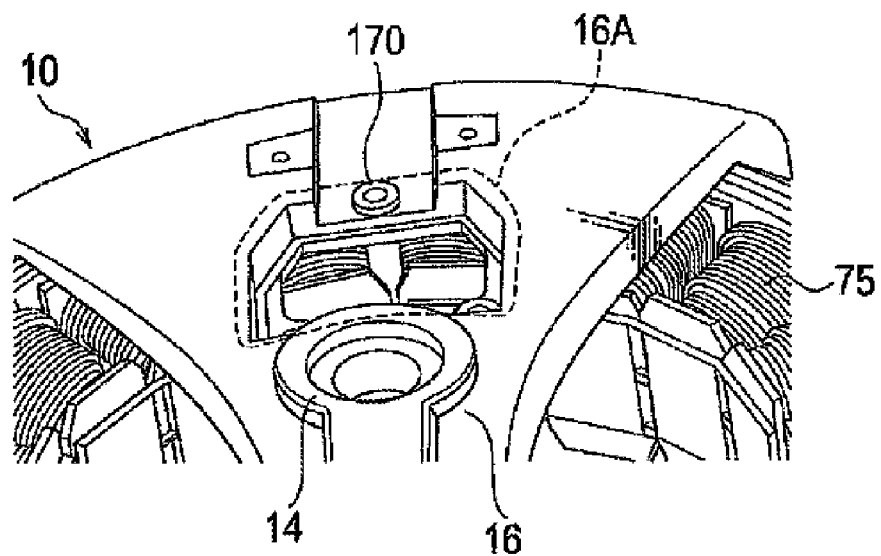
Figure 16:
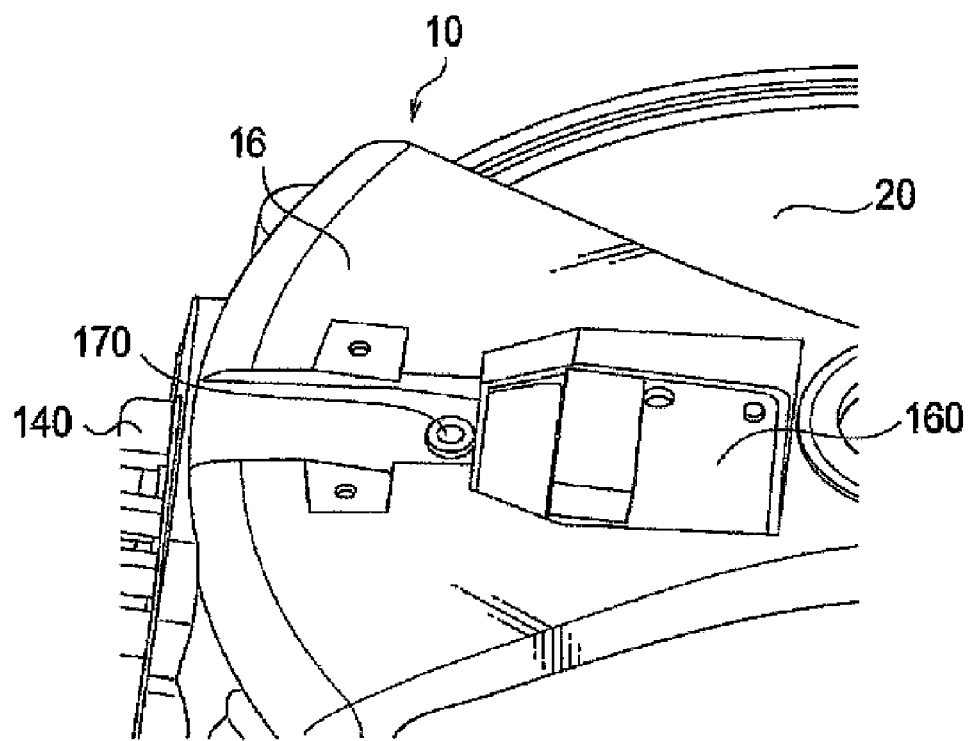
FIG. 16 is a view showing the assembly of the case 10, the stator core 70, and the leading out member 140 according to Modification 2.

The placement of the temperature detecting element 85 according to Modification 2 will be described below with reference to the drawings. FIGS. 14 and 15 are views each showing an assembly of the case 10, the stator core 70, and the leading out member 140 according to Modification 2. FIG. 16 is a view showing the assembly (the case 10, the stator core 70, and the leading out member 140) on which the mold resin 20A is molded, according to Modification 2.

As shown in FIGS. 14 to 16, the hole 17 provided in the bottom surface portion 16 of the case 10 receives a tubular attachment member 170 accommodating the temperature detecting element 85 (not shown in FIGS. 14 to 16; see FIGS. 9 and 10). Note that it is preferable to use a material having higher heat conductivity than that of the mold resin 20A as the material for the attachment member 170. After the attachment member 170 is inserted into the case 10, the mold resin 20A is molded on the stator core 70, the case 10 and the attachment member 170. Moreover, at the time of attachment of the position detecting circuit board 160, the temperature detecting element 85 is inserted into the attachment member 170.

Note that the signal line 132 (not shown in FIGS. 14 to 16; see FIGS. 9 and 10), which is connected to the temperature detecting element 85 inserted into the hole 17 together with the attachment member 170, is connected to the position detecting circuit board 160.

[Embodiment 2]

(Structure of Electric Motor Vehicle)

Figure 17:
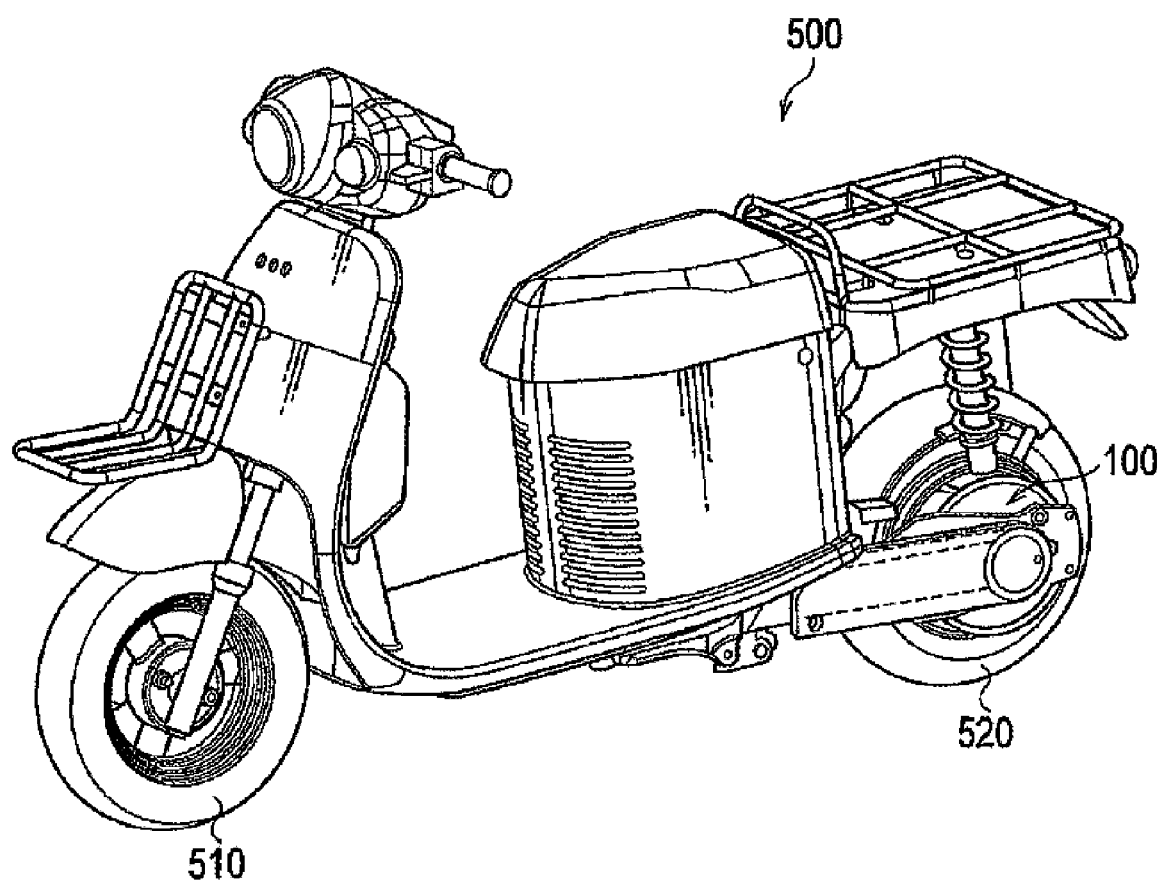
FIG. 17 is a view showing an example of an electric motor vehicle 500 according to Embodiment 2.

An electric motor vehicle according to Embodiment 2 will be described below with reference to the drawing. FIG. 17 is a view showing an example of an electric motor vehicle 500 according to Embodiment 2.

As shown in FIG. 17, the electric motor vehicle 500 is a motorcycle including a front wheel 510 and a rear wheel 520. Here, the rear wheel 520 is provided with the electric motor 100 and is a drive wheel.

Note that the electric motor vehicle 500 provided with the electric motor 100 is not limited to a motorcycle. For example, the electric motor vehicle 500 may be a three-wheeled vehicle or a four-wheeled vehicle.

[Other Embodiments]

The present invention has been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

The hole formed in the mold resin 20A in which the temperature detecting element 85 is to be buried may be formed in advance by use of a mold before the temperature detecting element 85 is placed therein.

The hole formed in the mold resin 20A in which the temperature detecting element 85 is to be buried may be formed by injecting resin into a mold after the temperature detecting element 85 is placed therein. In other words, the temperature detecting element 85 may be subjected to molding together with the stator core 70.

The temperature detecting element 85 only needs to be provided between two adjacent ones of the stator teeth 72 (coils 75). Thus, as long as it is between two adjacent stator teeth 72 (coils 75), the temperature detecting element 85 can be placed at any position in the radial direction of the stator core 70.

What is claimed is:

1. An electric motor comprising:
    a stator of columnar shape including a stator core of annular shape and mold resin molding the stator core, the stator core accommodating a rotor configured to rotate about a rotary shaft; and
    a temperature detecting element buried in the mold resin, wherein
    the stator has an outer circumferential side surface extending continuously in a circumferential direction of the stator, and a pair of end surfaces forming a top and a bottom of the stator,
    the stator core includes a plurality of stator teeth around which a coil wounded respectively, and
    the temperature detecting element is accommodated to a hole expanding from any one of the pair of end surfaces and is buried in the mold resin from the end surface provided with the hole at a position between two adjacent stator teeth.

2. The electric motor according to claim 1, further comprising a case which accommodates the stator core, wherein
    the case has a bottom surface portion which covers at least partially the bottom of the stator and the mold resin, and
    the bottom surface portion has an insert hole to receive the temperature detecting element.

3. The electric motor according to claim 2, further comprising a tubular attachment member which accommodates the temperature detecting element, wherein the temperature detecting element is inserted in the insert hole together with the attachment member.

4. The electric motor according to claim 2, wherein the bottom surface portion is provided with a position detecting circuit board configured to detect a position of the rotor, and the temperature detecting element is connected to the position detection circuit board by a signal line.

5. The electric motor according to claim 1, further comprising a case which accommodates the stator core, wherein the case includes a terminal for leading out a power line connected to the coil, to an outside of the electric motor, and the temperature detecting element is connected to the terminal by a signal line.

6. An electric motor vehicle comprising the electric motor according to claim 1.

7. An electric motor vehicle comprising the electric motor according to claim 2.

8. An electric motor vehicle comprising the electric motor according to claim 3.

9. An electric motor vehicle comprising the electric motor according to claim 4.

10. An electric motor vehicle comprising the electric motor according to claim 5.

\* \* \* \* \*